Patented Aug. 9, 1938

2,126,419

UNITED STATES PATENT OFFICE 2,126,419

BITUMINOUS BINDER MATERIAL AND PROCESS OF PRODUCING THE SAME

William Shannon Smith, Battle Creek, Mich.

No Drawing. Application September 4, 1937, Serial No. 162,505

9 Claims. (Cl. 106—31)

This invention relates to improvements in bituminous binder material and the process of producing it and to the road or pavement mixture embracing the same.

The objects of the invention are:

First, to provide a bituminous road material that is semi-liquid in composition, which is capable of being used cold and will keep in storage or for transportation in its semi-liquid condition until emplaced for use and that is resistant to the extremes of atmospheric temperatures.

I accomplish the objects of my invention and I practise my invention as indicated in the following specification.

In carrying out my invention I make use of sodium chloride in the form of a very fine table salt, which I use because it insures a complete salt solution or brine without granules of salt in the same. To keep the brine in this condition and give it an alkali effect so that it will saponify and mix with the asphalt, I produce substantially a saturate solution of lime water, which I admix with the brine. This material, in the proportions that I mix it, has substantially the same specific gravity of the asphalt with which it is mixed and therefore it readily admixes with the same and has no tendency to separate therefor owing to differences in specific gravity. It preserves the semi-fluid condition.

I prepare a salt solution for use in this behalf by taking 400 pounds of water, 20 pounds of very finely pulverized table salt (sodium chloride). The solution when the salt is dissolved has a specific gravity of about 1.015. I prepare a lime solution by the use of 40 pounds of water, 1½ pounds of lime, this being about as strong a solution of lime water as it is possible to prepare. It is practically a saturate solution and has a specific gravity of about 1.005. In preparing I admix in the proportion of 94 pounds of natural lake or petroleum asphalt of 70 to 100 penetration. To this I add 16 pounds of the mixture of salt solution and calcium solution made up of 90% of the salt solution and 10% of the lime or calcium solution thoroughly mixed together. To this I add about 8 pounds or one gallon of petroleum distillate, 32-40 Baumé. This mixture whether used in surface treating macadam or road mixes or used as a binder material in standard or specially designed asphalt or tar mixing plants, eliminates all necessity for heating and adds to the stability and durability of the resulting pavement or road mixture. This sodium chloride and calcium hydroxide mixture may be added to the bituminous substances at the refinery or point of production, thereby reducing the cost of manufacturing the product at standard asphalt plants or it may be used by pressure distributors on road mixwork that is emplaced. That is to say, this mixture is introduced into the aggregates that are emplaced by pressure nozzles at frequent intervals which distributes a layer of this material over the exterior of each aggregate particle and retains the same effectively in place when the volatiles evaporate.

When the binder is introduced into the road mix, the same may be transported in that form or it may be piled up and stored ready for use, the volatiles merely evaporating from a slight layer at the exterior and seal up the remainder until it is distributed by suitable means and emplaced. When emplaced, the whole mixture is compressed tamped and the volatiles are allowed to evaporate.

When the asphalt is from 80 to 100 penetration, ⅓ less of my binder material is used.

The quantity of distillate may be very considerably varied.

I desire to claim my invention in the specific form in which I have reduced it to practice and also broadly as pointed out in the appended claims.

Having thus described my invention what I claim as new and desire to secure by Letters Patent is:

1. A bituminous road paving material which is a semi-liquid mass comprising the aggregate, a binder sufficient therefor comprising a heavy bituminous substance—94 pounds of natural lake or petroleum asphalt of 60 to 80 penetration, with a cut back therefor consisting of 16 pounds of a solution of sodium chloride and lime water, of which 90% is a 5% brine or salt solution and 10% is a 4% lime solution and 8 pounds of petroleum distillate, 32-40 Baumé test, admixed as a semi-liquid mass for use cold in forming pavements and roadways, as specified.

2. A binder for road or paving material comprising a heavy bituminous substance—94 pounds of natural lake or petroleum asphalt of 60 to 80 penetration, with a cut back therefor consisting of 16 pounds of a solution of sodium chloride and lime water, of which 90% is a 5% brine or salt solution and 10% is a 4% lime solution and 8 pounds of petroleum distillate, 32-40 Baumé test, admixed as a semi-liquid mass for use cold in forming pavements and roadways, as specified.

3. A binder for road or paving material comprising a heavy bituminous substance—94 pounds of natural lake or petroleum asphalt of 60 to 80 penetration, with a cut back therefor consisting of 16 pounds of a solution of sodium chloride and lime water, of which 90% is a 5% brine or salt solution and 10% is a 4% lime solution and petroleum distillate admixed as a semi-liquid mass for use cold in forming pavements and roadways, as specified.

4. A binder for road or paving material comprising a heavy bituminous substance—94 pounds of natural lake or petroleum asphalt of 60 to 80 penetration, with a cut back therefor consisting of 16 pounds of a solution of sodium chloride and lime water, of which 90% is a 5% brine or salt solution and 10% is a 4% lime solution.

5. A binder for road or paving material comprising a heavy bituminous substance—94 pounds of natural lake or petroleum asphalt of 60 to 80 penetration, with a cut back therefor consisting of a solution of sodium chloride and lime water and 8 pounds of petroleum distillate, 32–40 Baumé test, admixed as a semi-liquid mass for use cold in forming pavements and roadways, as specified.

6. A binder for road or paving material comprising a heavy bituminous substance—94 pounds of natural lake or petroleum asphalt of 60 to 80 penetration, with a cut back therefor consisting of a solution of sodium chloride and lime water and petroleum distillate admixed as a semi-liquid mass for use cold in forming pavements and roadways, as specified.

7. A binder for road or paving material comprising a heavy bituminous substance, a cut back therefor consisting of 16 pounds of a solution of sodium chloride and lime water, of which 90% is a 5% brine or salt solution and 10% is a 4% lime solution and 8 pounds of petroleum distillate, 32–40 Baumé test, admixed as a semi-liquid mass for use cold in forming pavements and roadways, as specified.

8. A binder for road or paving material comprising a heavy bituminous substance, a cut back therefor consisting of 16 pounds of a solution of sodium chloride and lime water, of which 90% is a 5% brine or salt solution and 10% is a 4% lime solution and petroleum distillate admixed as a semi-liquid mass for use cold in forming pavements and roadways, as specified.

9. A binder for road or paving material comprising a heavy bituminous substance, a cut back therefor consisting of a solution of sodium chloride and lime water and petroleum distillate admixed as a semi-liquid mass for use cold in forming pavements and roadways, as specified.

WILLIAM SHANNON SMITH.